Figure 1:
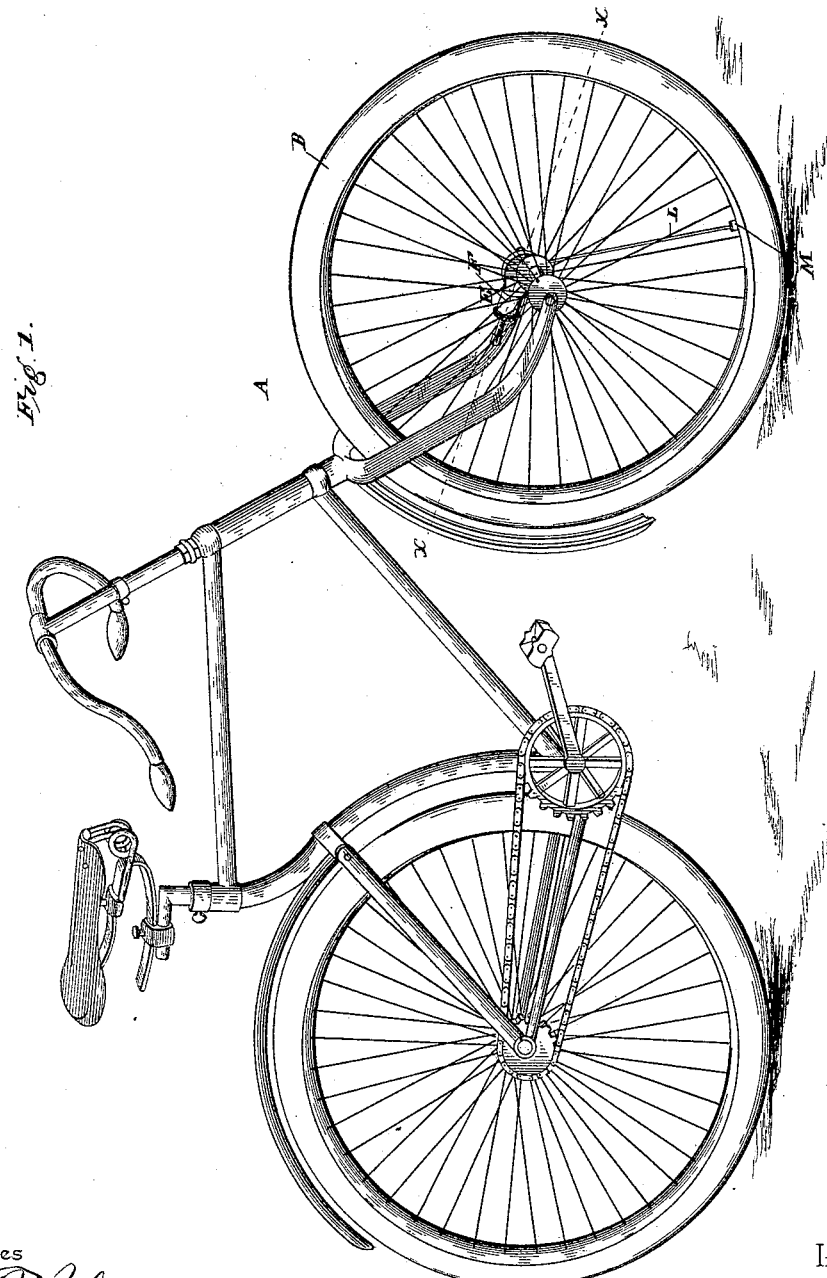

(No Model.) 2 Sheets—Sheet 1.

J. F. CRANSTON.
TIRE INFLATING DEVICE.

No. 499,659. Patented June 13, 1893.

Witnesses
F. M. Johnson

Inventor
James F. Cranston
By his Attorneys,
C. A. Snow & Co.

(No Model.) 2 Sheets—Sheet 2.
J. F. CRANSTON.
TIRE INFLATING DEVICE.
No. 499,659. Patented June 13, 1893.
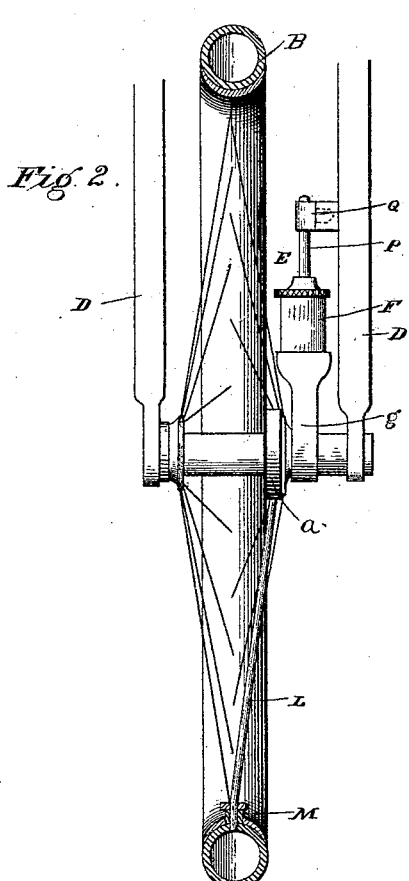
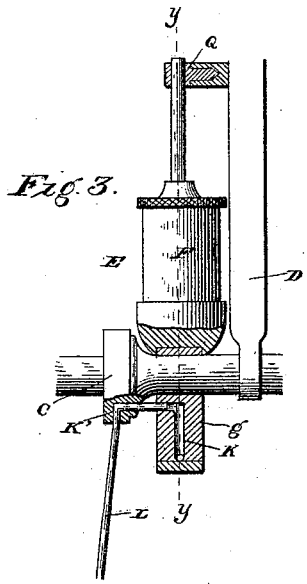
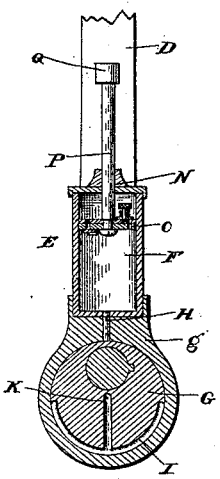
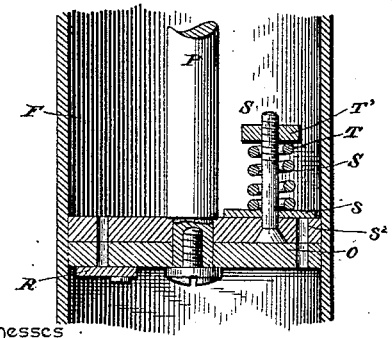
Witnesses Inventor
James F. Cranston
By his Attorneys,

UNITED STATES PATENT OFFICE.

JAMES F. CRANSTON, OF SPRINGFIELD, MASSACHUSETTS.

TIRE-INFLATING DEVICE.

SPECIFICATION forming part of Letters Patent No. 499,659, dated June 13, 1893.

Application filed September 6, 1892. Serial No. 445,167. (No model.)

*To all whom it may concern:*

Be it known that I, JAMES F. CRANSTON, a citizen of the United States, residing at Springfield, in the county of Hampden and State of Massachusetts, have invented a new and useful Tire-Inflating Device, of which the following is a specification.

My invention relates to bicycles, tricycles, and similar wheeled-vehicles equipped with pneumatic tires, and refers particularly to means for inflating such tires.

The objects in view are to provide means for inflating the tires coincidently with the rotation of the wheels; to provide means for inflating the tires by power derived from the axles; to provide adjustable controlling and safety devices whereby a uniform expansive or inflating pressure may be maintained; to provide means whereby the above may be accomplished without adding perceptibly to the power necessary to propel the machine; and to provide, for accomplishing the above, means which may be arranged inconspicuously, and which may be applied to any ordinary machine with a minimum change or adaptation of construction.

Further objects and advantages of my invention will appear in the following detail description of the mechanism and the novel features thereof will be particularly pointed out in the appended claims.

In the drawings, Figure 1 is a perspective view of a bicycle equipped with my attachment in the operative position. Fig. 2 is a sectional view on line $x-x$ of Fig. 1. Fig. 3 is a longitudinal sectional view of the pump, upon the plane indicated by line $x-x$ of Fig. 1, enlarged to show the channels, ways or ducts, through which the air passes. Fig. 4 is a longitudinal sectional view on line $y-y$ of Fig. 3. Fig. 5 is an enlarged sectional view of the plunger, to show the pressure-controlling mechanism.

Referring to the drawings, A represents the wheel, B the hollow tire, C the axle, and D the forks of a machine of ordinary construction, and E represents the pump, carried by the fork and connected to the axle for operation.

F represents the cylinder of the pump, which is provided at its lower end with a strap or yoke, $g$, in which operates an eccentric, G, secured to the axle of the wheel between the hub, $a$, and the adjacent fork. This eccentric is keyed firmly to the axle, and turns, therefore, with the wheel, being in juxtaposition to the hub. The adjacent end of the cylinder, which I will designate the inner end, for the reason that it is in proximity to the axle of the wheel, is provided with a port, H, which is adapted, at each revolution of the eccentric to register with a surface channel, I, in the latter, said channel, I, extending preferably about one half the distance around the periphery of the eccentric, whereby it is in alignment with the port during one half the revolution of the wheel. Extending from this channel is a radially-disposed channel or way, K, which communicates with a corresponding channel or way, K', in the hub, the latter terminating at the periphery of the hub where it communicates with the inner end of the conductor-tube, L, which extends radially to the felly of the wheel and fits into a nipple, M, connected to the tire. The outer end or head of the cylinder is provided with inlet perforations, N N, and within the cylinder operates the piston or plunger, O, having a rod or stem, P, which extends centrally through the head of the cylinder and is connected by means of a swivel, Q, to the fork of the machine. Thus, as the inner end of the cylinder is carried around and oscillated by the movement of the eccentric the outer end of the stem or rod P turns pivotally and the plunger or piston reciprocates longitudinally in the cylinder.

The piston or plunger is provided with the usual spring inlet valve, R, attached to its under side and adapted to open as the plunger moves toward the outer end of the cylinder.

The pressure-controlling mechanism or governor, S, is carried by the plunger, and consists, essentially, of a spring-pressed valve, $s$, guided by a central stem, $s'$, and adapted to cover and close the exhaust vent, $s^2$. The coiled spring, T, is disposed about the stem, $s'$, bears at its inner end upon the valve, $s$, and is engaged at its outer end by the adjusting nut, T', which is threaded upon the outer end of the stem.

This being the construction of my inflating device, the operation thereof is as follows: The outer end of the stem or rod of the plunger is permanently attached to the fork or other stationary part of the vehicle, (this may be varied to suit special constructions by attaching it to a brace or other part of the machine,) and the cylinder is connected to the axle of the wheel, which is provided with an eccentric employed to cause the necessary reciprocation of the cylinder, thus forcing the piston or plunger toward the inner end of the cylinder at each revolution of the wheel. During the time that the piston or plunger is advancing toward the inner end of the cylinder, the series of channels, ways, or ducts (above-described) which form the connection between the cylinder and the hollow tire register, and compressed air is therefore discharged from the cylinder into the tire. When the internal pressure of air within the tire has reached the limit desired, the air, instead of being forced into the latter is allowed to escape through the safety vent, the controlling spring being adjusted by means of the nut to allow only a predetermined pressure within the cylinder. As long as the pressure within the tire is less than this predetermined pressure the air will pass, at each revolution, from the cylinder to the tire, but as soon as the limit has been reached the air escapes through the vent.

By arranging the pump in alignment with and close to the fork it is out of the way and virtually out of sight, and by employing an eccentric which will cause but a slight throw of the piston the pump will be operated and the tire will be maintained at the desired expansion without adding perceptibly to the power necessary to propel the vehicle. Furthermore, the weight of the inflating device is carried by the frame of the machine, and, with the exception of the eccentric, does not rotate with the wheel.

It should be understood that I do not desire to limit myself to the details of construction and arrangement shown and described herein, for the reason that they may be varied extensively without departing from the spirit of my invention, and must be varied to suit the different styles of vehicles to which the inflating device may be applied.

The construction shown and described herein is preferable to any within my knowledge at this time, but I am aware that the construction of the pump may be varied and yet accomplish the same result in substantially the same way; this being true, also, of the other parts of the mechanism, including the governor.

Having thus described my invention, what I claim, and desire to secure by Letters Patent of the United States, is—

1. In combination with a wheel having a pneumatic tire and a channeled hub, an inflating pump connected to a permanent part of the frame, and means for communicating motion from the wheel to the pump and provided with channels or ducts communicating with the interior of the pump and the channels in the wheel, substantially as specified.

2. In combination with a wheel having a pneumatic tire, and a channeled hub, an inflating pump connected to a permanent part of the frame and an eccentric fixed to the axle, connected to the pump to convey motion thereto, and provided with channels communicating with the interior of the pump and the channels in the wheel, substantially as specified.

3. In combination with a wheel having a pneumatic tire and a channeled hub connected by a conductor-tube to the tire, the inflating pump communicating with said channeled hub, and means for conveying motion from the wheel to the pump, substantially as specified.

4. In combination with a wheel having a pneumatic tire, an eccentric fixed to the axle of the wheel, and an inflating pump pivotally connected to the frame and having a yoke embracing said eccentric, communicating channels and ducts being provided in the eccentric and hub to convey the compressed air from the pump to the tire, substantially as specified.

5. In combination with a wheel having a pneumatic tire, an eccentric carried by the axle of the wheel, an inflating pump having its piston rod or stem swiveled to a permanent part of the frame, and its cylinder provided with a yoke encircling said eccentric, and means for conveying the compressed air to the tire, substantially as specified.

6. In combination with a wheel having a pneumatic tire, an eccentric carried by the axle of the wheel, and provided with channels or ways which are connected by means of a tube with the tire, and an inflating pump, mechanically connected to said eccentric and communicating with the channels in the latter, substantially as specified.

7. In combination with a wheel having a pneumatic tire, and an inflating pump mechanically connected to the axle of the wheel and communicating by means of suitable channels, ways or ducts with the tire, the pressure regulating mechanism carried by the pump and controlled by the pressure within such channels, ways or ducts to limit the inflation of the tire, substantially as specified.

8. In combination with a wheel having a pneumatic tire, and an inflating pump connected to the wheel and communicating with the tire, the pressure-regulating device, carried by the piston or plunger of said pump and having a spring-pressed valve provided with a tension-adjusting nut, substantially as specified.

9. In combination with a wheel having a pneumatic tire, an eccentric carried by the axle of the wheel, an inflating pump mechanically connected to said eccentric, the piston rod of said pump being swiveled to a permanent part of the frame, channels or ways provided in the eccentric, and a tube connecting said channels or ways with the nipple of the tire, as set forth.

In testimony that I claim the foregoing as my own I have hereto affixed my signature in the presence of two witnesses.

JAMES F. CRANSTON.

Witnesses:
MARY E. BOSWORTH,
HENRY H. BOSWORTH.